Patented June 3, 1924.

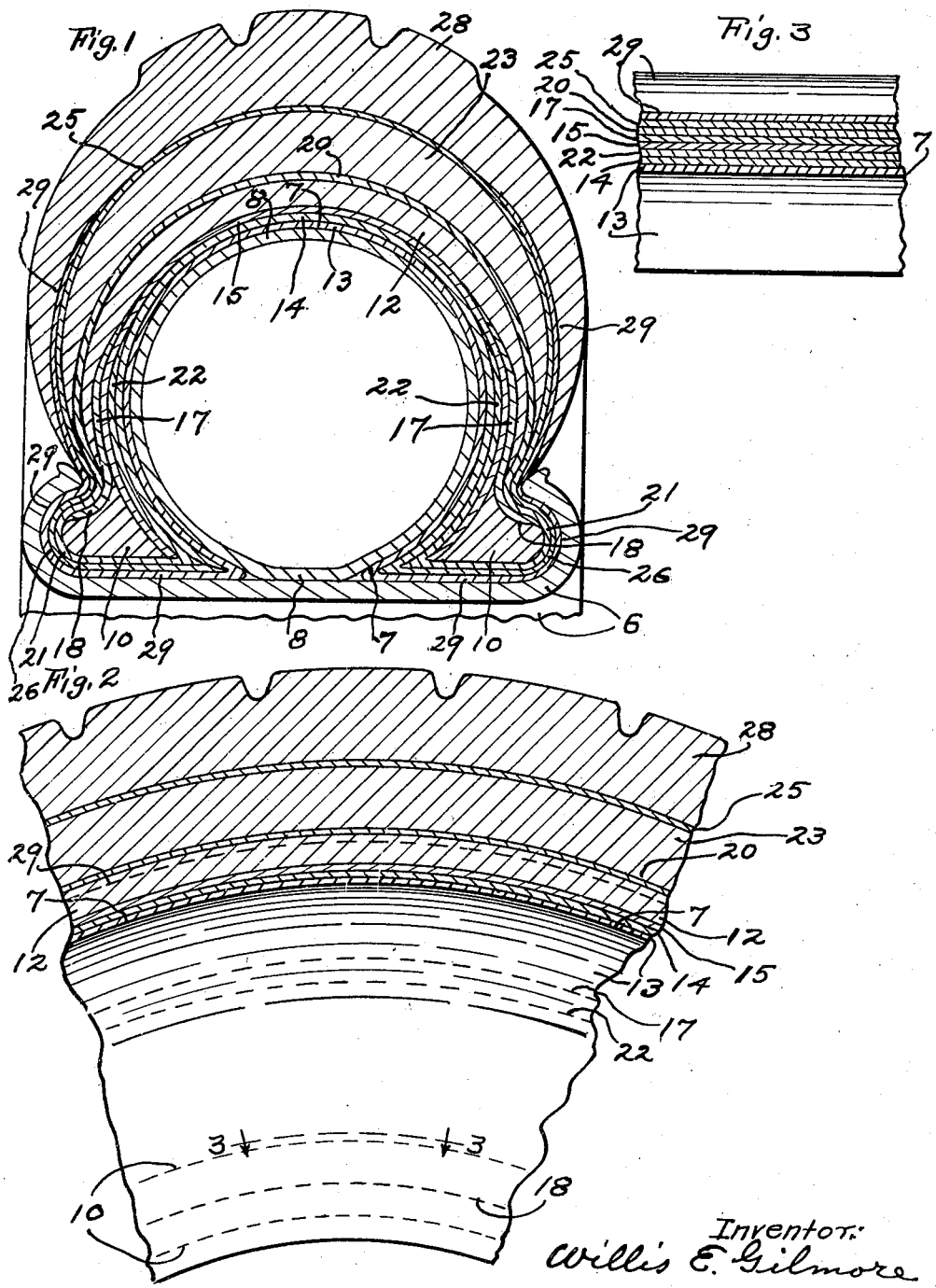

1,496,086

UNITED STATES PATENT OFFICE.

WILLIS E. GILMORE, OF EUCLID, OHIO.

PNEUMATIC-TIRE CASING.

Application filed December 7, 1921. Serial No. 520,467.

*To all whom it may concern:*

Be it known that I, WILLIS E. GILMORE, a citizen of the United States, residing at Euclid Village, in the county of Cuyahoga and State of Ohio, have invented a new and useful Pneumatic-Tire Casing, of which the following is a specification.

This invention relates to improvements in pneumatic tire casings, and pertains more especially to a laminated tire-casing which has a pneumatic-tube-receiving chamber adapted to extend circumferentially of a wheel-rim and comprises two spaced beads participating in the formation of the rim-engageable portions and opposite sides respectively of the casing, an inner elastic section extending circumferentially of said chamber and having an internal covering comprising substantially non-stretchable fabric and attached to said beads, a flexible external covering for and attached to said inner elastic section and to the beads and comprising non-stretchable fabric, an intermediate elastic section extending circumferentially of said inner elastic section and embracing and attached to the second-mentioned covering, a flexible external covering for and attached to said intermediate elastic section and to the beads and comprising substantially non-stretchable fabric, and an outer elastic section extending circumferentially of said intermediate elastic section and embracing and attached to the last-mentioned covering.

One object of this invention is to so construct a casing for a pneumatic tire of a given size that the pneumatic inner tube required for said size of tire is remarkably well protected by said casing and materially smaller in size than the inner tube heretofore required for said size of tire.

Another object is to produce a laminated pneumatic tire casing which is simple in construction and adequately resilient, and has great strength and durability.

With this object in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a transverse section of a portion of a pneumatic tire comprising my improved tire-casing and shown as containing a pneumatic tube and mounted on a wheel-rim. Fig. 2 is a central section of said portion of said tire-casing, without the pneumatic tube and wheel-rim. Fig. 3 is a section taken along the line 3—3, Fig. 2.

In said drawings, 6, in Fig. 1, indicates a portion of a wheel-rim provided with a pneumatic tire comprising a casing embodying my invention, and said casing has a pneumatic-tube-receiving chamber 7 adapted to extend circumferentially of said rim and shown in Fig. 1 as containing an inflated pneumatic tube 8.

My improved tire-casing comprises two spaced beads 10 participating in the formation of the rim-engageable portions and opposite sides respectively of the casing, and Fig. 1 shows said beads spaced transversely of the wheel-rim 6. Said beads are adapted to extend circumferentially of said rim and preferably composed of elastic and compressible material such, for instance, as rubber.

My improved tire-casing also comprises an inner elastic section 12 composed of elastic and compressible material such, for instance, as rubber, and extending circumferentially of the chamber 7 and substantially crescent-shaped in cross-section and preferably arranged wholly between the outer circumference of the casing and the outer circumference of the beads 10. Said inner elastic section 12 has a flexible and substantially non-elastic and substantially non-stretchable laminated internal covering forming walls of the chamber 7 and comprising preferably at least three superposed layers respectively composed of a flexible sheet of substantially or approximately non-stretchable fibrous fabric preferably made of sea-island cotton, and 13, 14 and 15 indicate respectively the inner layer, the intermediate layer and the outer layer of said three superposed layers. Adjacent layers of said laminated covering are cemented together in any approved manner, and the central portion of the layer 15 is arranged next the inner side of and cemented to the central portion of the inner elastic section 12. Said layer 15 extends to and covers the inner side of and is cemented to the beads 10.

Two flexible and substantially non-stretchable attaching strips 17 are employed in forming opposite side portions respectively of my improved tire-casing and interposed between the layer 15 and opposite side portions respectively of the inner elastic section 12, and said strips form portions of the hereinbefore mentioned laminated covering and are cemented to said elastic section and to said layer 15. Each strip 17 is composed of substantially or approximately non-stretchable fibrous fabric preferably made of sea-island cotton, and extends, as at 18, to the outer side of the adjacent bead 10 and is cemented to said bead.

My improved tire-casing also comprises a flexible and substantially non-elastic and substantially non-stretchable external covering 20 for and extending circumferentially of and embracing the inner elastic section 12, and said covering preferably consists of a sheet of substantially or approximately non-stretchable fibrous fabric preferably made of sea-island cotton and is cemented to said elastic section. Said sheet or covering 20 is provided adjacent each bead 10 with an extension 21 which is cemented to the adjacent attaching strip 17 and embraces the outer side portion of and is cemented to said bead and extends internally of said bead to and between the hereinbefore mentioned layers 14 and 15 and is cemented to said layers, and between said layers extends outwardly, as at 22 in Fig. 1, to a point beyond the outer circumference of said bead. Obviously the portions 22 of the extensions 21 of the covering 20 participate in the formation of the internal covering for the inner elastic section 12.

My improved tire-casing also comprises an intermediate elastic section 23 composed of elastic and compressible material such, for instance, as rubber, and extending circumferentially of the inner elastic section 12 and embracing and cemented to the external covering 20 for said inner elastic section. Preferably the intermediate elastic section 23 is substantially crescent-shaped in cross-section and arranged wholly between the outer circumference of the casing and the outer circumference of the beads 10.

My improved tire-casing also comprises a flexible and substantially non-elastic and substantially non-stretchable external covering 25 for and extending circumferentially of and embracing the intermediate elastic section 23, and said covering preferably comprises a sheet of substantially or approximately non-stretchable fibrous fabric preferably made of sea-island cotton, and is cemented to said elastic section, and said sheet extends, as at 26, to and embraces and is cemented to the bead-embracing extensions 21 of the external covering 20 for the inner elastic section 12 and extends internally of the beads 10 to the intermediate layer 14 of the hereinbefore mentioned laminated covering, and preferably the sheet forming the covering 25 is large enough in dimensions to form said layer 14 which is therefore a part of said sheet.

My improved tire-casing is shown as comprising a tread-forming outer elastic section 28 composed of elastic and compressible material such, for instance, as rubber, and extending circumferentially of the intermediate elastic section 23 and embracing and cemented to the external covering 25 for said intermediate section. The sheet forming the layer 13 of the aforesaid laminated covering is provided at each bead 10 with an extension 29 which is arranged to form a rim-engageable surface of the tire-casing and extends to the inner side of and is cemented to the adjacent side portion of the outer elastic section 28 and at said portion of said outer elastic section is cemented to the adjacent portion of the external covering 25 for the intermediate elastic section 23.

By the hereinbefore described construction it will be observed that the external covering 20 for the inner elastic section 12 and the laminated covering comprising the strips 17 form a flexible and substantially non-stretchable case for said elastic section, that said case is substantially crescent-shaped in cross-section and houses the inner elastic section 12, that the external covering 20 for said inner elastic section and the external covering 25 for the intermediate elastic section 23 form a flexible and substantially non-stretchable case which is substantially crescent-shaped in cross-section and houses said intermediate section, that the strips 17 and the sheets employed in forming the hereinbefore mentioned coverings all participate in the formation of enclosures for the beads 10, that the external covering 20 for the inner elastic section 12 is snugly interposed at the outer circumference of the beads 10 between the external covering 25 for the intermediate section 23 and the strips 17, and that at the outer circumference of each bead 10 the illustrated tire-casing comprises eight thicknesses of flexible and substantially non-stretchable fabric so that said casing has great strength and durability at said circumference of said bead.

What I claim is—

A tire-casing which has a tube-receiving chamber adapted to extend circumferentially of a wheel-rim and comprises the following:—two spaced beads participating in forming the rim-engageable portions of the casing and adapted to extend circumferentially of said rim, an inner elastic section extending circumferentially of said chamber and having a flexible internal covering, a flexible external covering for said inner elastic section, an intermediate elastic section extending circumferentially of said inner elastic section and embracing the second-mentioned covering, a flexible external covering for said intermediate elastic section, and an outer elastic section extending circumferentially of said intermediate elastic section and embracing and attached to the last-mentioned covering, all of the coverings being substantially non-stretchable and attached to the aforesaid beads, and the first-mentioned covering comprising two flexible and substantially non-stretchable attaching strips which are arranged next the inner side of and attached to opposite side portions respectively of the aforesaid inner elastic section and each extend between and are attached to the adjacent bead and the adjacent portion of the outer covering for said inner elastic section.

In testimony whereof, I sign the foregoing specification, this 26th day of November, 1921.

WILLIS E. GILMORE.